G. D. HARRIS & J. S. POLLARD.
APPARATUS FOR DEHYDRATING FOODS.
APPLICATION FILED JULY 16, 1909. RENEWED JAN. 4, 1912.
1,018,388.
Patented Feb. 20, 1912.
2 SHEETS—SHEET 1.
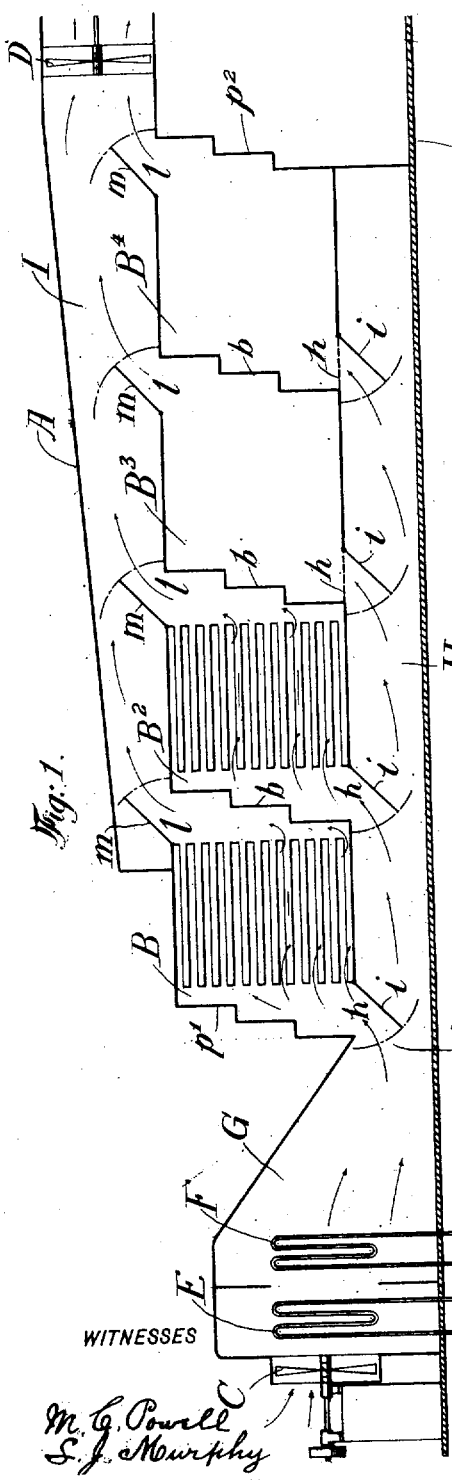
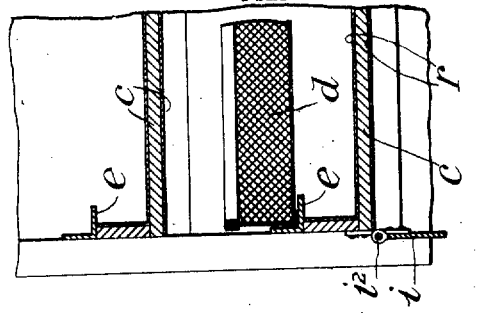
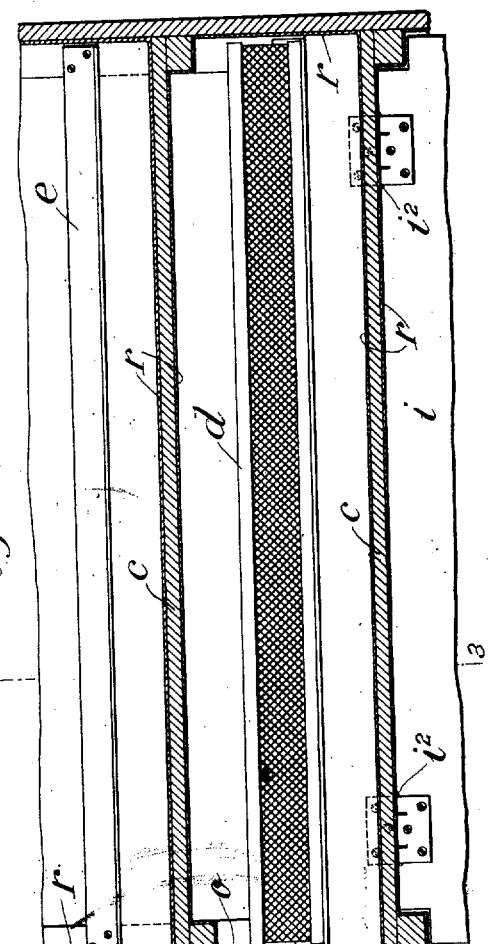
WITNESSES
M. G. Powell
E. J. Murphy
INVENTORS.
Gordon Don Harris &
BY James S. Pollard
Griffin & Bernhard
their ATTORNEYS

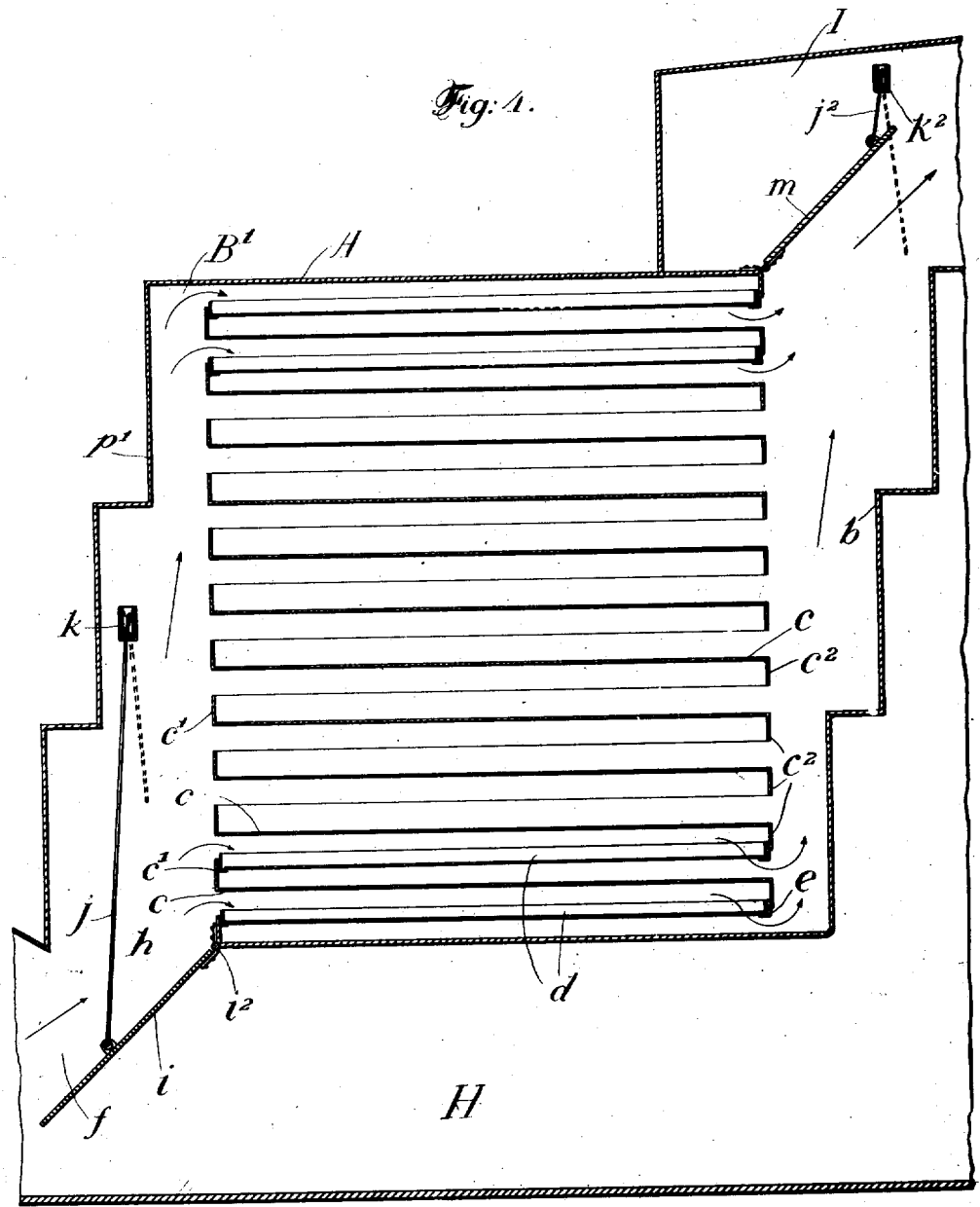

UNITED STATES PATENT OFFICE.

GORDON DON HARRIS, OF BAY SHORE, AND JAMES S. POLLARD, OF MAMARONECK, NEW YORK, ASSIGNORS, BY MESNE ASSIGNMENTS, TO GENERAL DEHYDRATOR COMPANY, A CORPORATION OF NEW YORK.

APPARATUS FOR DEHYDRATING FOODS.

1,018,388. Specification of Letters Patent. Patented Feb. 20, 1912.

Application filed July 16, 1909, Serial No. 507,906. Renewed January 4, 1912. Serial No. 669,435.

*To all whom it may concern:*

Be it known that we, GORDON DON HARRIS, a citizen of the United States, residing at Bay Shore, Suffolk county, Long Island, and State of New York, and JAMES S. POLLARD, a citizen of the United States, residing at Mamaroneck, Westchester county, and State of New York, have jointly invented a certain new and useful Apparatus for Dehydrating Foods, of which the following is a specification.

This invention is an apparatus for dehydrating foods, particularly fruits and vegetables, and the object in view is to expeditiously and thoroughly remove or eliminate the aqueous constituents from the food products under treatment, and to effect these results in a thorough, efficient and economical manner.

It is well established that decay or deterioration will not take place in fruits or vegetables in the absence of moisture, and the present invention is aimed at removing from said fruits and vegetables the watery constituents on which decay depends, and, moreover, to eliminate this watery element so rapidly, and under such other conditions, that the residuary constituents of the fruits and vegetables remain practically unchanged. That is to say, the invention is an apparatus for producing dehydrated fruits and vegetables which retain the normal characteristics of the fresh products, except that the water has been eliminated therefrom.

The following table shows substantially the weight of aqueous vapor contained in one hundred cubic feet of air saturated therewith, at the temperature specified:

| | | | |
|---|---|---|---|
| At 50 degrees Fahrenheit | | .936 | ounces. |
| At 70 " | " | 1.826 | " |
| At 90 " | " | 3.386 | " |
| At 113 " | " | 6.488 | " |
| At 131 " | " | 10.350 | " |

In practicing the invention we endeavor to deliver the heated air to the apparatus at a temperature of substantially 61 degrees (F.) higher than the outside air. For example, if the outside air has a temperature of 70 degrees (F.), we would heat it to substantially 131 degrees (F.) prior to its introduction into the dehydrating apparatus. Assuming that the air at 70 was saturated with moisture, one hundred cubic feet thereof would carry 1.826 ounces of moisture, and by raising the temperature thereof to 131 degrees, it would carry, when saturated, 10.350 ounces of moisture, or an increase, due to the elevation of temperature, of substantially 8.5 ounces. In other words, under the conditions specified, each 100 cubic feet of air would remove from the food products, theoretically, 8 and ½ ounces of moisture. In practice, however, in order to thoroughly eliminate the water so rapidly that the fruits and vegetables are not otherwise changed from their natural condition, we employ, as a rule, about 90% more air than the theoretical quantity above specified.

The amount of water in all edible fruits and vegetables being known, or capable of determination, the volume of air to be heated and driven through the dehydrating apparatus may be easily computed.

The apparatus embodies certain features of construction and operation disclosed in a prior application filed by us on Feb. 13, 1909, Serial No. 477,667, but it contains several improvements thereon relating particularly to the arrangement of the fruit or vegetable perforated trays whereby the air is compelled to pass through the fruit thereon instead of merely above and below the same.

In the accompanying drawings, we have illustrated one practical embodiment of the invention, but the construction shown therein is to be understood as illustrative, only, and not as defining the limits of the invention.

Figure 1 shows a longitudinal diagrammatic view, centrally of the apparatus, with certain elements shown in elevation; Fig. 2 is a partial, longitudinal sectional view, showing, particularly, a tray, the manner of supporting the same, and the arrangement of partitions above and below it; Fig. 3 is a fragmentary cross sectional view taken on line 3—3 of Fig. 2; and Fig. 4 is a partial, longitudinal sectional view, on an enlarged scale, through a tier or series of trays showing, also, the air inlet and exit thereto.

In the drawings, A, represents the main or outer casing of the dehydrating apparatus which is divided into a plurality of chambers, B', B², B³, and B⁴ by means of partitions, b, preferably constructed in a step-up form, for reasons hereinafter stated. The number of chambers may, of course, be regulated as desired. Each of the chambers, B' to B⁴ is divided into a series of compartments by horizontal partitions, c, which may be composed of wood protected by a metal facing, r, and supported in each of these compartments is a foraminous tray, d, adapted to contain the fruits or vegetables to be treated. The trays, d, are supported at their sides by angle-irons, e, running lengthwise of the main casing and so positioned with reference to the horizontal partitions, c, that a free space, preferably equal in height to that of the tray, is provided above and below said tray, so as to permit the free passage of air through the tray. It will be noted that partitions, c, have a bent-up member, c', at one end thereof, and a turned-down member, c², at the opposite end, and that said members are so positioned with reference to the trays as to preclude the passage of air through the apparatus, when the trays are located therein, without compelling it to pass through the foraminous bottoms of the trays, and, consequently, be forced into intimate contact with the material being operated upon.

Air is forced into the apparatus by means of a blower, C, and exhausted therefrom by means of a second blower, D. The air after having passed through the blower, C, is brought into contact with cooling coils or equivalent means, shown diagrammatically at, E, for the purpose of condensing, in whole or in part, the moisture contained in the air. The air, having been dehydrated as described, is then brought in contact with a heating coil or equivalent means, shown diagrammatically at, F, for the purpose of raising the temperature of the air to the degree desired. The cooling and heating coils are housed in a casing or chamber, G, the tapering outlet, f, from which leads to a trunk or main, H, from which air passes to the chambers, B' to B⁴ containing the several series of trays, through the openings, h. These openings, h, are controlled by dampers, i, pivoted at, i², and these may be regulated by a cord or cable, j, passing over a pulley, k, thence extending exteriorly of the casing to a convenient location for operation. Each of the chambers, B' to B⁴, is provided with an exit, l, opening into a common air tapering exhaust flue or trunk, I, in the end of which is located the exhausting fan, D, to which reference has been previously made. The exits, l, are controlled by dampers, m, similar to dampers, i, hereinbefore described, and which may be operated in the same way by cables, j², passing over pulleys, k². Access may be had to the several chambers, B' to B⁴, for the purpose of introducing and removing the trays, d, therefrom, through the medium of the pivoted doors, J, located in the sides of the casing, A. These doors are provided with latches, o, and although the number and size of such doors may be regulated as desired, it is preferred to have a separate door for each tray.

By constructing the end members, p' and p² of the casing and the partitions, b, in step-up form shown in the drawings, and hereinbefore referred to, it will be observed that the air inlet to each series of trays tapers upward, i. e., it is larger at the bottom, and that the exhaust therefrom tapers downward, i. e., it is larger at the top. By constructing the end members and partitions as described the course of the air through the apparatus is facilitated, and each of the chambers receives its proper proportion of air. Moreover, as the air escapes from the chambers to B' to B⁴, containing the trays, it passes directly into the tapering exit trunk or flue, I without being permitted to enter any other tray-containing chamber, whereby each series of trays necessarily receives freshly heated air, and the entry thereto of air which has become laden with moisture is precluded.

The frame work of the apparatus, and the outer casing, are preferably made of wood, but in practice it has been found desirable to line the interior thereof, including the partitions and in-take and out-going trunks, with galvanized iron, r, for the purpose of providing a smooth and sanitary surface on the interior of the apparatus.

In practice we have found it desirable and advantageous to have the in-going air enter the apparatus at a pressure of about three ounces, and to allow it to escape therefrom at a pressure of about two ounces, thereby maintaining a slight pressure in the apparatus at all times during the operation.

The material operated upon, such as bananas, apples, carrots, turnips, parsnips, potatoes, etc., are usually peeled and then cut to the desired size before placing the same in the trays. While the length of time required for effecting complete dehydration varies according to the material treated, and the particular method of operation, yet, as a rule, we are enabled to completely eliminate the liquid or moisture from said material in one hour.

It will, of course, be understood that slight modification may be made in the apparatus described, as well as in the mode of operation set forth, without departing from the spirit or substance of our invention.

While the claim in this application are restricted to an apparatus, we may add that the novel process herein disclosed forms the subject-matter of a companion application, Serial No. 511,038, Aug. 3, 1909.

Having thus fully described the invention, what we claim as new, and desire to secure by Letters Patent is:

1. In an apparatus for dehydrating foods and similar products, a casing, an air inlet and an air exit thereto, a series of step-up partitions therein forming a plurality of chambers, a series of partitions dividing each chamber into compartments, and a foraminous tray in each compartment.

2. In an apparatus for dehydrating foods and similar products, a casing containing a chamber separated into compartments by means of partitions, a foraminous tray in each of said compartments, an air inlet to the compartment above each tray, an air exit from the compartment below each tray whereby the air is forced to pass downwardly through the tray and the material thereon, and stepped partitions near the respective end walls of said chamber, said partitions forming with said end walls flues of varying cross sectional areas, with which flues communicate the air inlets and the air exits, respectively.

3. In an apparatus for dehydrating foods and similar products, a chamber provided with a series of trays having foraminous bottoms, means whereby air is compelled to pass into the trays through their tops and downwardly through the foraminous bottoms of the trays, means for withdrawing the air after its passage therethrough, and stepped partitions near the respective end walls of said chamber, said partitions forming with said end walls flues of varying cross sectional areas, with which flues communicate the air inlets and the air exits, respectively.

4. In an apparatus for dehydrating foods and similar products, a casing, a chamber therein containing compartments, a foraminous tray in each of said compartments an so positioned therein as to leave a free space above and below each tray, means for introducing air above each tray and for compelling it to pass downwardly through the tray, and an air exit for the air after it passes through said trays, and stepped partitions near the respective end walls of said chamber, said partitions forming with said end walls flues of varying cross sectional areas, with which flues communicate the air inlets and the air exits, respectively.

5. In an apparatus for dehydrating foods and similar products, a casing, a plurality of chambers therein, an air inlet flue common to all of said chambers, a tapering air intake from said flue to each of said chambers, a valve for controlling each of the air intakes, an air exhaust flue common to all of said chambers, and a tapering air exit from each of said chambers to the flue, the taper of said exits being in an opposite direction to the taper of the air intakes.

6. In an apparatus for dehydrating foods and similar products, a casing, a plurality of chambers therein formed by step-up partitions, an air inlet flue common to all of said chambers, an air exit flue common to all of said chambers, a tapering air off-take from each of said chambers leading into said exit flue, and a valve for controlling the passage of air through each of said off-takes.

7. In an apparatus for dehydrating foods and similar products, a casing, partitions within said casing for dividing it into a series of upwardly tapering chambers, an air inlet flue connected to the bottom of said chambers, an air exit flue connected to the top of all the chambers, means for cooling the air, and means for subsequently heating the air prior to its introduction into said air inlet flue.

8. In an apparatus for dehydrating foods and similar products, a casing, a plurality of step-up partitions therein for dividing it into a series of chambers, a plurality of horizontal partitions in each chamber for dividing it into compartments, a tray with a foraminous bottom in each of the compartments, and means for forcing air into each compartment and compelling it to pass downwardly through the foraminous bottom of the tray.

In testimony whereof we have signed our names to this specification in the presence of two subscribing witnesses.

GORDON DON HARRIS.
JAMES S. POLLARD.

Witnesses:
JAS. H. GRIFFIN,
H. I. BERNHARD.